United States Patent Office
3,044,666
Patented July 17, 1962

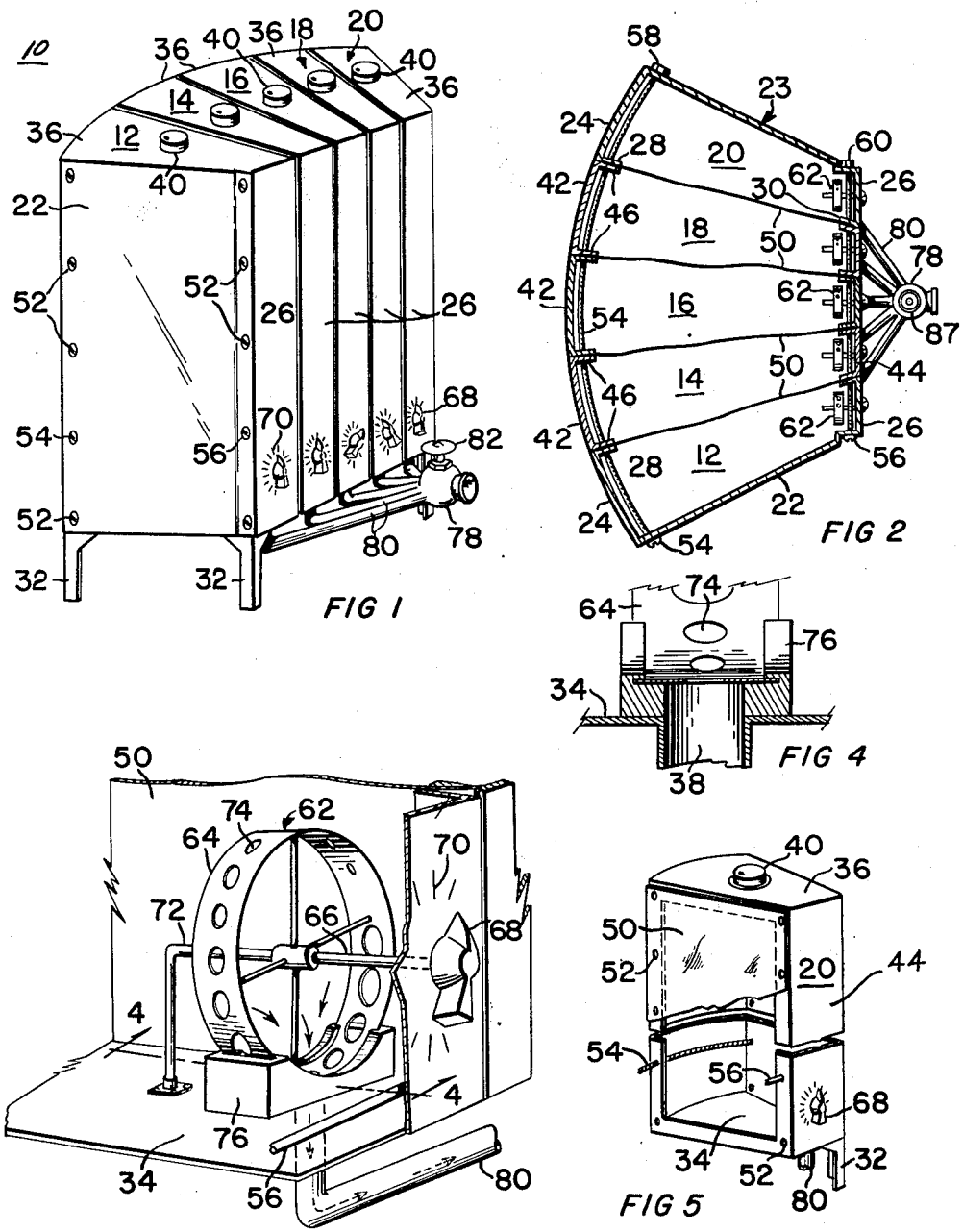

3,044,666
APPARATUS FOR DISPENSING MEASURED QUANTITIES OF LIQUIDS
Arthur M. Dyer, 523 N. Graves, El Cajon, Calif.
Filed Oct. 28, 1958, Ser. No. 770,146
2 Claims. (Cl. 222—145)

The present invention relates to apparatus for dispensing measured quantities of liquids, and more particularly to apparatus for dispensing liquid quantities which bear a pre-selected and continuing proportional relationship to each other.

In dispensing liquids from a plurality of reservoirs it is difficult to adjust and correlate the rates of flow from the various reservoirs to produce liquid quantities from each reservoir which bear a continuing proportional relationship to each other. For example, if we assume that we have a pair of identical, filled reservoirs and wish to obtain liquid quantities of one gallon and ten gallons, respectively, from these reservoirs, it is possible to select sizes of outlets which will achieve this for a very limited period of time. However, the pressure head of the second reservoir will drop much more rapidly than the first, and it will be seen that the ratio of quantities dispensed will immediately vary. Thus, for each gallon dispensed from the first reservoir as will get something less than the desired ten gallons from the second reservoir because the pressure heads in the two reservoirs are no longer the same.

According to the present invention, an apparatus is provided which comprises walls or other means forming a reservoir for liquids. This reservoir is divided into a plurality of reservoirs or compartments by flexible walls which deform or are displaced by a higher liquid level in one compartment, as compared with an adjacent compartment, whereby the liquid height in adjacent compartment tends to become the same. Thus, the pressure imposed at the bottom of the various compartments would be essentially the same, and location of the compartment outlets at the bottom of the compartments would accordingly be effective to discharge liquids at proportional rates which do not change substantially even though one compartment is being emptied at a faster rate than its neighbor. The phenomenon is substantially similar where the liquids in adjacent compartments are of different densities.

The present invention also provides means for adjusting the rates of flow through the compartment outlets by providing means which define a plurality of different size orifices interposable in the path of the liquids flowing from the various compartments. In addition, the invention comprehends the provision of a manifold which is adapted to accept the fluid flows from the various compartments and discharge these flows through a single valve means.

Such an apparatus has particular application to a device for measuring or metering out predetermined or pre-selected quantities of various colors of paints for the production of a certain composite color shade. It will be apparent that the provision of a device or machine such as this affords an opportunity for paint stores to mix color shades immediately upon receipt of customer orders, thereby avoiding the stocking of a multiplicity of shades, and avoiding the delay of ordering the shade from a central warehouse. With the present apparatus it is merely necessary for the user to dial a certain number combination, which adjusts the quantity of paint discharged from the various compartments in a manner to be described. Then, since the machine is effective to maintain the same proportions of components regardless of the paint contained in each compartment, the opening of the manifold discharge valve provides the necessary portions of each paint necessary to produce the shade desired. The discharge valve is located above the level of the compartment outlets so that the conduits to the valve are always full of paint, and require a definite pressure to move liquid through them and out of the discharge valve.

Other objects and features of the present invention will be readily apparent to those skilled in the art from the following specification and appended drawings wherein is illustrated a preferred form of the invention, and in which:

FIGURE 1 is a perspective view of the apparatus of the present invention;

FIGURE 2 is a plan view in cross section of the apparatus of FIGURE 1;

FIGURE 3 is an enlarged detail view in perspective, illustrating the orifice band and the means for rotating the same;

FIGURE 4 is a view taken along line IV—IV of FIGURE 3; and

FIGURE 5 is a perspective view of one of the compartment sections of the present invention.

Referring now to the drawings, there is illustrated an apparatus for dispensing measured quantities of liquids, and which will hereinafter be described in connection with the dispensing of measured quantities of various colors of paint. It will be apparent that the apparatus, generally designated 10, is useful in a variety of applications, but for purposes of illustration will be described as a dispenser of paints. This application of apparatus 10 is very useful in local paint stores, for example, for mixing color shades immediately after receiving customer orders for such shades. As previously mentioned, this avoids the stocking of many pre-mixed shades of colors, and also avoids the undesirable delay attendant upon the ordering of special shades when the stock is exhausted. As will become apparent, the present apparatus 10 permits the user to set the apparatus for the measurement of the particular colors necessary to produce the color shade he desires. Thereafter it is merely a matter of thoroughly mixing the color components which have been dispensed by the apparatus. It should be noted, however, that a certain amount of blending or mixing occurs in the normal operation of apparatus 10.

Apparatus 10 comprises a plurality of compartments 12, 14, 16, 18, and 20 which are secured together to form a main reservoir for the containment of the various colored paints. More particularly, the outer compartments 12 and 20 preferably include rigid outer walls 22 and 23, a front wall section 24 and a rear wall section 26, walls 22 and 23 each include a continuous, peripheral, and inwardly directed flange 28 and 30 respectively. Walls 22 and 23 are vertically disposed and extend longitudinally or upwardly to form an elongated three sided compartment which is considerably higher than it is wide or deep. Compartments 12 and 20 each carry a pair of suitable legs 32 which are secured to walls 22 and 23 in any suitable manner, as by welding or the like.

Compartments 12 and 20 are also each provided with a base or bottom wall and an upper or top wall 36, each bottom wall 34 being provided with an outlet opening, FIGURE 4, and each top wall 36 being provided with a closure or cap 40 having a suitable vent opening therethrough. Cap 40 may be one of the well known types which is adapted to vent an associated compartment in one position, but which is adapted to completely seal the compartment when the cap is rotated a quarter turn.

Intermediate the outer compartments 12 and 20 are preferably located a plurality of intermediate compartments, such as compartments 14, 16, and 18. Although as few as two compartments for apparatus 10 may be useful in certain cases, in the case of a paint dispensing apparatus such as here described it is preferable to provide a fairly great selection of base colors. Accordingly, the number of intermediate compartments may be fairly high.

Each of compartments 14, 16, and 18 are essentially similar to compartments 12 and 20 except that both side walls thereof are flexible, as will be seen. That is, each of the intermediate compartments extends vertically in closely adjacent and co-extensive relationship with the outer compartments, each of the intermediate compartments including a front wall section 42, similar to front wall 24, and including a rear wall section 44 which is similar to rear wall section 26. Each front wall section 42 is provided with a pair of inwardly disposed flanges 46 which are co-extensive with the continuous peripheral flange 28 of the outer compartments. In addition, compartments 14, 16, and 18 each include a top or upper wall 36 and cap 40 identical to the upper wall and cap 40 of compartments 12 and 20. The intermediate compartments further include a bottom or lower wall 34 with the previously described outlet 38.

Thus it will be seen that the outer compartments have a side, top and bottom, and a front and back, and the intermediate compartments have a top and bottom, and a front and back. The third or closing wall of compartments 12 and 20, and the walls intermediate compartments 14 and 16, and 16 and 18, is a flexible or even stretchable wall 50. Each wall 50 is made of a material which will permit it to resist the corrosive, solvent, or similar properties of the liquids to be dispensed, the material may be in connection with the dispensation of paint, or the like, plastic or polyethylene material may be used. Walls 50 are provided to render the various compartments or to make the various compartments akin to a plurality of collapsible bags. That is, the material of each diaphragm or wall 50 is made sufficiently stretchable, or with a sufficient amount of excess material that it will be displaced when a compartment on one side of it is filled with liquid while the other side is empty or partly filled. The wall section 50 dividing the compartments is so flexible and loosely carried that it conforms to the pressure of the liquid materials on either side, and the result is that the interior of apparatus 10 defined by the exterior walls of the outer and intermediate compartments defines a main reservoir whose contents are at approximately the same level. Of course, if the liquid material in one of the compartments were of a greater density than the liquids in adjoining compartments, the liquid level of the various compartments might be different, but the pressure exerted by the liquids against the bottoms of the various compartments would be substantially the same. This is an important feature of the present invention.

Each flexible wall 50 is secured in position between adjoining flanges 28 and 46, or between a pair of flanges 46 as the case may be, by a plurality of screws or similar fasteners 52 which are disposed through the peripheral edges of each wall 50, and threaded into the flanges of the compartments. In addition, the various compartments are secured together by a pair of rods 54 and 56 which are disposed through suitable openings provided in the flange portions at the front and back, respectively, of each of the compartments, and which are secured in place by threaded nuts 58 and 60, respectively. In this manner each of the compartments is rendered fluid tight.

From the above description it will be seen that the liquid in each of the compartments imposes a pressure at its outlet similar to the pressures at the other compartment outlets by reason of the action of the walls 50. These walls in effect tend to equalize the liquid pressure at each of the outlets by reason of their conformation to the pressures within the various compartments. Thus, regardless of the amount of liquid remaining in the compartments the pressures at each of their outlets will be substantially the same.

The means for regulating the quantity of liquid flowing through each of the outlets is generally designated 62, and a plurality of such means 62 is provided, one for each compartment outlet. Means 62 preferably comprises a cylindrical ring or band 64 which is rigidly secured at its hub to a shaft 66. Shaft 66 is rotatably carried through rear wall section 26, and a knob or pointer 68 is secured to its outer end to permit rotation of shaft 66 and band 64. The rotated position of pointer 68, and consequently that of band 64, is indicated by marks or indicia 70 provided on the outer face of rear wall section 26. The hub of band 64 is rotatably carried by a shaft 72 which extends inwardly for securement to bottom wall 34.

Band 64 includes a series of orifices 74 which are progressively larger in size about the periphery of band 64. Band 64 is slidable within a convex track or way which is cut into a mount which is secured to bottom wall 34. Mount 76 is provided with a central opening in communication with outlet 38 so that when an orifice 74 is brought into alignment or register with the opening in mount 76, liquid will flow out of opening 38. Rotation of pointer 68 is operable to bring any of the orifices 74 into register with opening 38, indicia 70 indicating the particular orifice which is thin in register with opening 38. Since each of the compartments is provided with a similar band 64, it will be apparent that if each pointer 68 of the compartments is set on the same mark that the same orifice 74 will be in register with the compartment outlet 38, and the quantity of fluid flowing through each outlet 38 will be the same. As above discussed, it will be the same regardless of the relative amount of liquid contained in any of the compartments as compared with the remainder of the compartments. In a similar fashion, the pointer 68 of any compartment may be set at a different position from the pointers of the other compartments whereby a lesser or greater flow will be caused to pass out of opening 38, and the proportion at this lesser or greater flow bears to the flow of the other compartments will remain the same until the liquids in the compartments is substantially exhausted. Thus a series of orifices 74 are selectively interposable in the path of the liquids flowing from compartments 12 through 20 to thereby regulate the quantities of liquid flowing therefrom.

A common manifold 78 is provided which is connected to each of the outlets 38 by conduits 80. Manifold 78 is mounted at a height greater than the height of the outlets 38 whereby the conduits 80 are always full of liquid or paint when the manifold is closed by a valve 82. Thus, when valve 82 is opened the paint will flow out of conduits 80 by reason of the liquid pressures in the compartments, and not solely by reason of the effect of gravity on the paint in the conduits 80.

In the operation of apparatus 10, let us assume that it has been established by trial and error that 1, 2, 3, 4, and 5, parts of paint are required from the compartments 12, 14, 16, 18, and 20, respectively to give a particular desired color shade. Accordingly, the operator sets the pointers 68 at the indicia markings 70 which will provide this portion of paints. Next the caps 40 are checked to insure that the vents are open, and thereafter valve 82 is opened. Paint will flow out of each of the conduits 80 only in proportion to the size of the orifice in the bands 64. It should be noted here that band 64 also includes a portion without an orifice to permit 38 to be completely blocked off if desired.

As the various quantities of paint flow out of conduits 80 and through 82, they are collected in a suitable container, and mixing or blending is continued in any suitable fashion until the component paints are well mixed.

It will be apparent that a great number of apparatuses 10 could be distributed throughout the country in various paint stores, and since each apparatus was identical to all the others, the same color code settings of the pointers would produce identical colors on all of the apparatuses 10, provided, of course, that the compartments were each filled with a standard basic color. The dispensation of measured quantities in a particular proportion, of each of these basic colors would produce the desired color shade.

Apparatus 10 is simple in operation, easily manufactured, and adapted to be used with a minimum of maintenance, apparatus 10 is straightforward in operation and lends itself particularly well to use in dispensing measured quantities of paint or other liquids, in the manner above described.

While certain preferred embodiments of the invention have been specifically disclosed, it is understood that the invention is not limited thereto as many variations will be readily apparent to those skilled in the art and the invention is to be given its broadest possible interpretation within the terms of the following claims:

I claim:

1. Apparatus for dispensing measured quantities of liquids, said apparatus comprising means forming a reservoir; a plurality of flexible walls disposed within said reservoir to divide the interior of said reservoir into a plurality of liquid storage compartments, said compartments each having an outlet; a plurality of rotatable bands mounted to said means and within said compartments, respectively, said bands each having a plurality of orifices which are selectively brought into register with said outlets, respectively, upon rotation of said bands; means coupled to said bands for rotation thereof; means for indicating the rotated positions of said bands; and a manifold having a plurality of conduits in communication with said outlets, respectively, said manifold having a valve for regulating the flow of liquid out of said manifold.

2. Apparatus according to claim 1 and characterized in that said valve is located at a height greater than said outlets.

References Cited in the file of this patent
UNITED STATES PATENTS

| | | |
|---|---|---|
| 1,707,058 | Kuwertz | Mar. 26, 1929 |
| 1,765,844 | Maynard et al. | June 24, 1930 |
| 2,515,570 | Rubinfield | July 18, 1950 |
| 2,630,251 | Edwards | Mar. 3, 1953 |
| 2,698,114 | Buhr | Dec. 28, 1954 |
| 2,758,747 | Stevens | Aug. 14, 1956 |